INVENTOR.
JOSEPH T. SCHOOLER

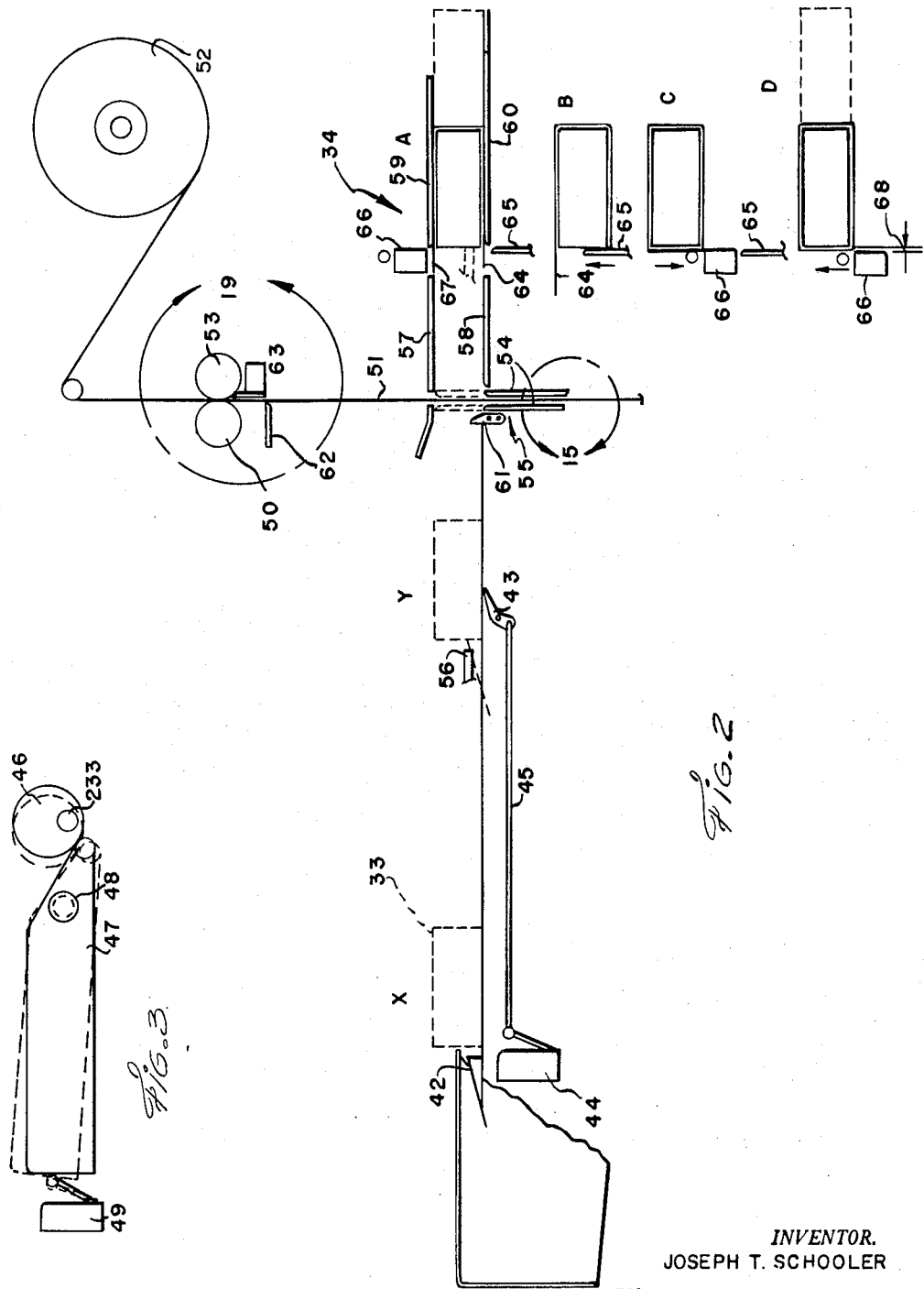

April 12, 1966   J. T. SCHOOLER   3,245,634
BANDING MACHINE
Original Filed June 29, 1960   10 Sheets-Sheet 3
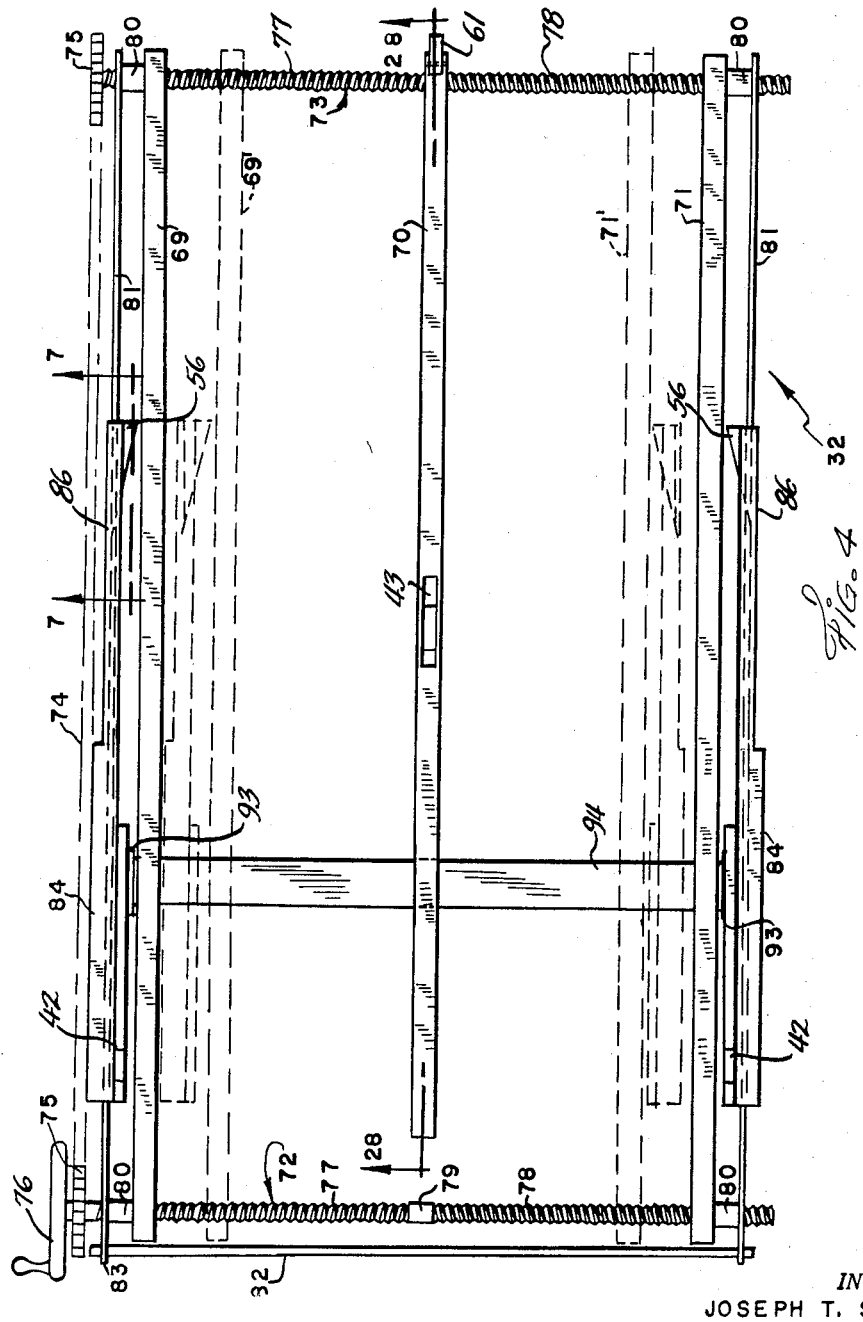
INVENTOR.
JOSEPH T. SCHOOLER
BY
ATTORNEY April 12, 1966     J. T. SCHOOLER     3,245,634
BANDING MACHINE
Original Filed June 29, 1960     10 Sheets-Sheet 4
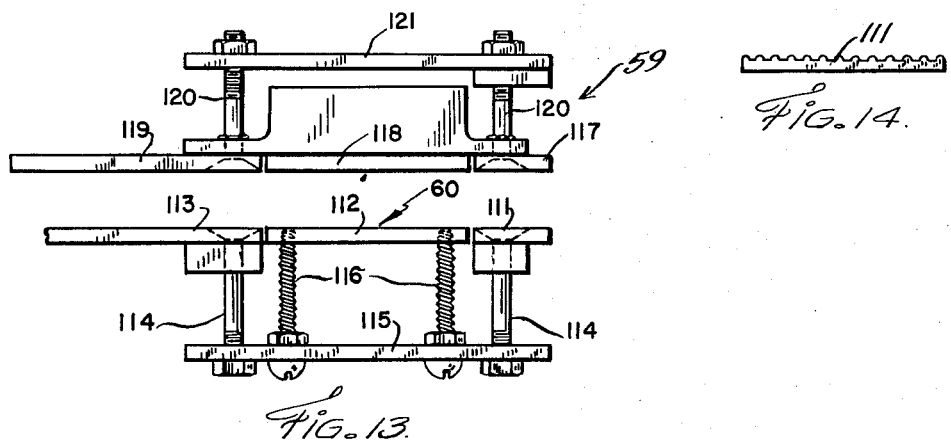
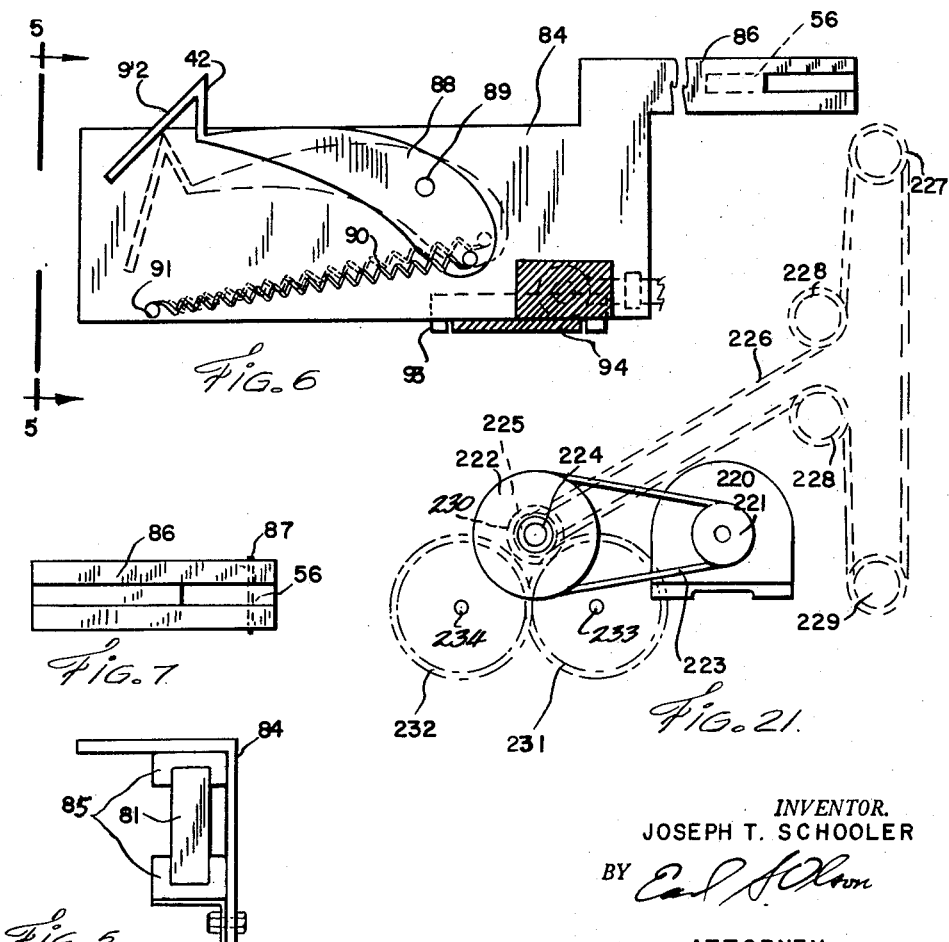
INVENTOR.
JOSEPH T. SCHOOLER
BY
ATTORNEY

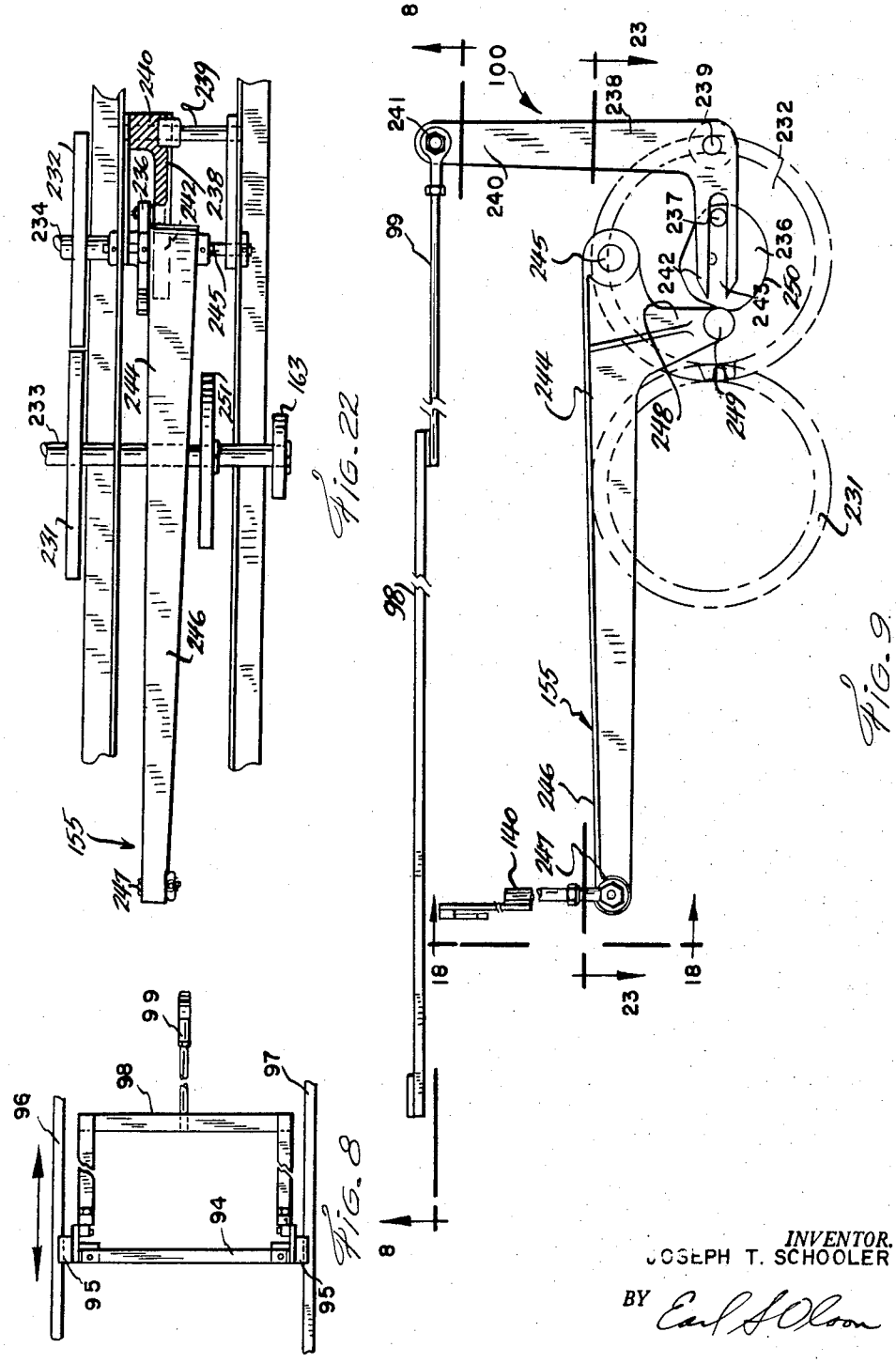

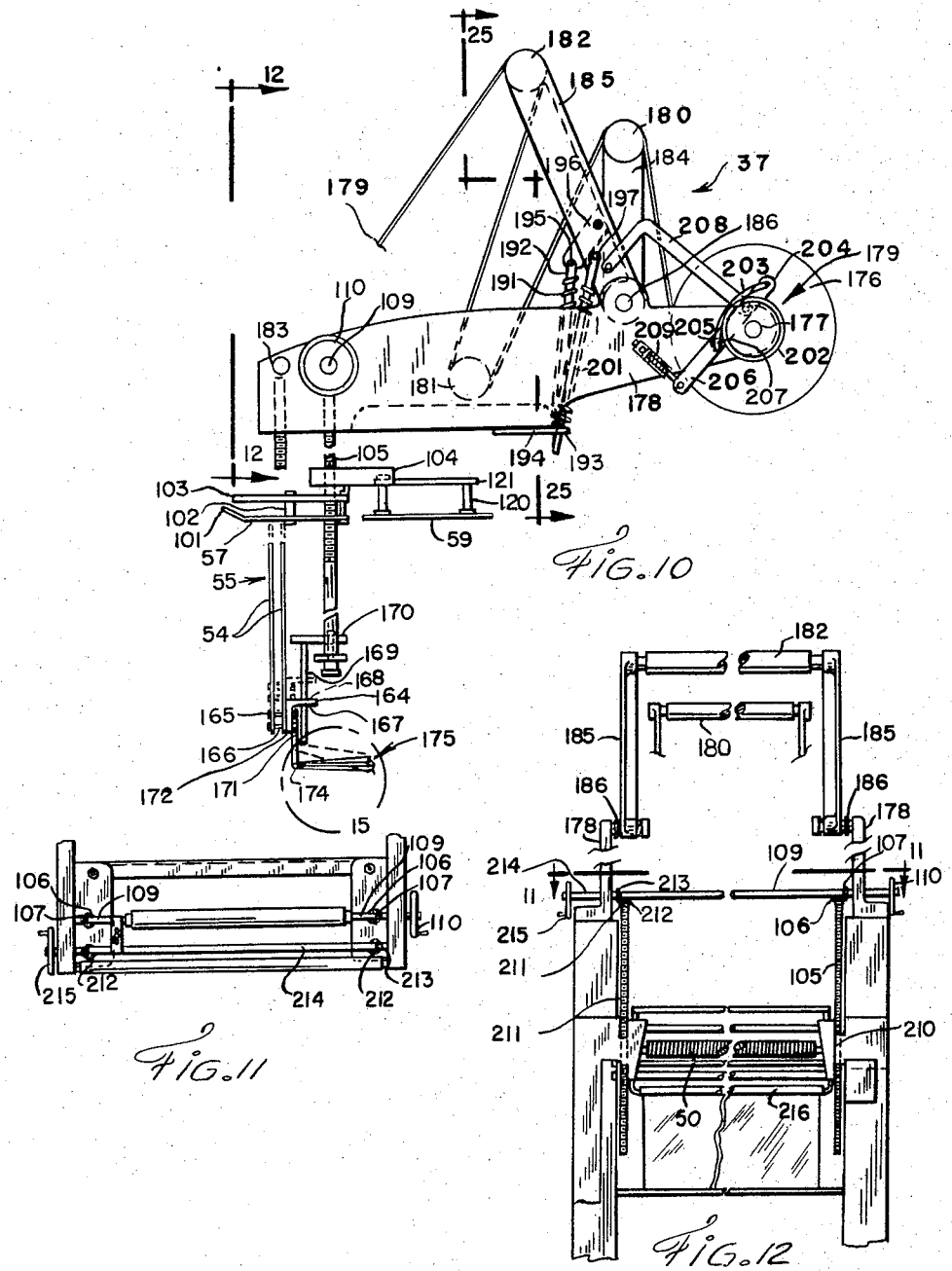

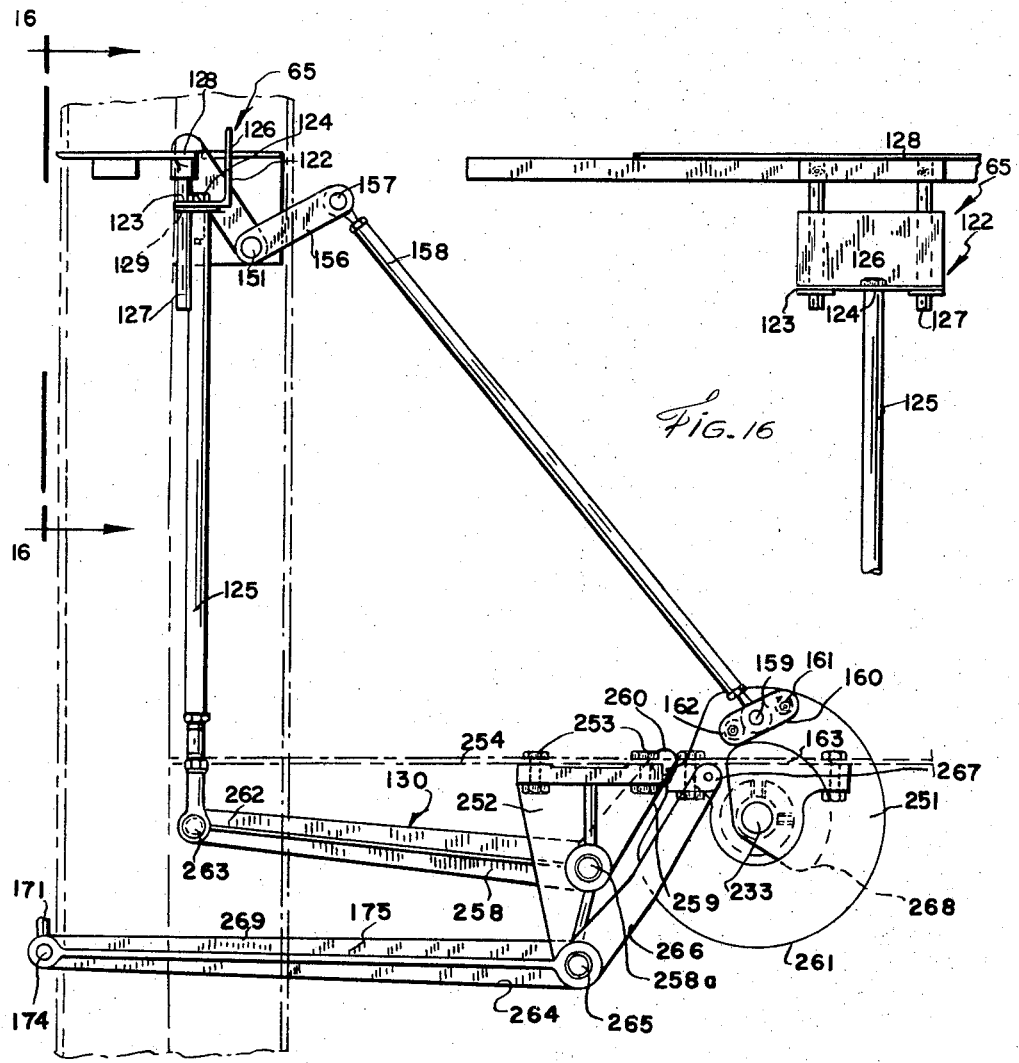

INVENTOR.
JOSEPH T. SCHOOLER

April 12, 1966 J. T. SCHOOLER 3,245,634
BANDING MACHINE

Original Filed June 29, 1960 10 Sheets-Sheet 9

INVENTOR.
JOSEPH T. SCHOOLER
BY
ATTORNEY

April 12, 1966   J. T. SCHOOLER   3,245,634
BANDING MACHINE
Original Filed June 29, 1960   10 Sheets-Sheet 10
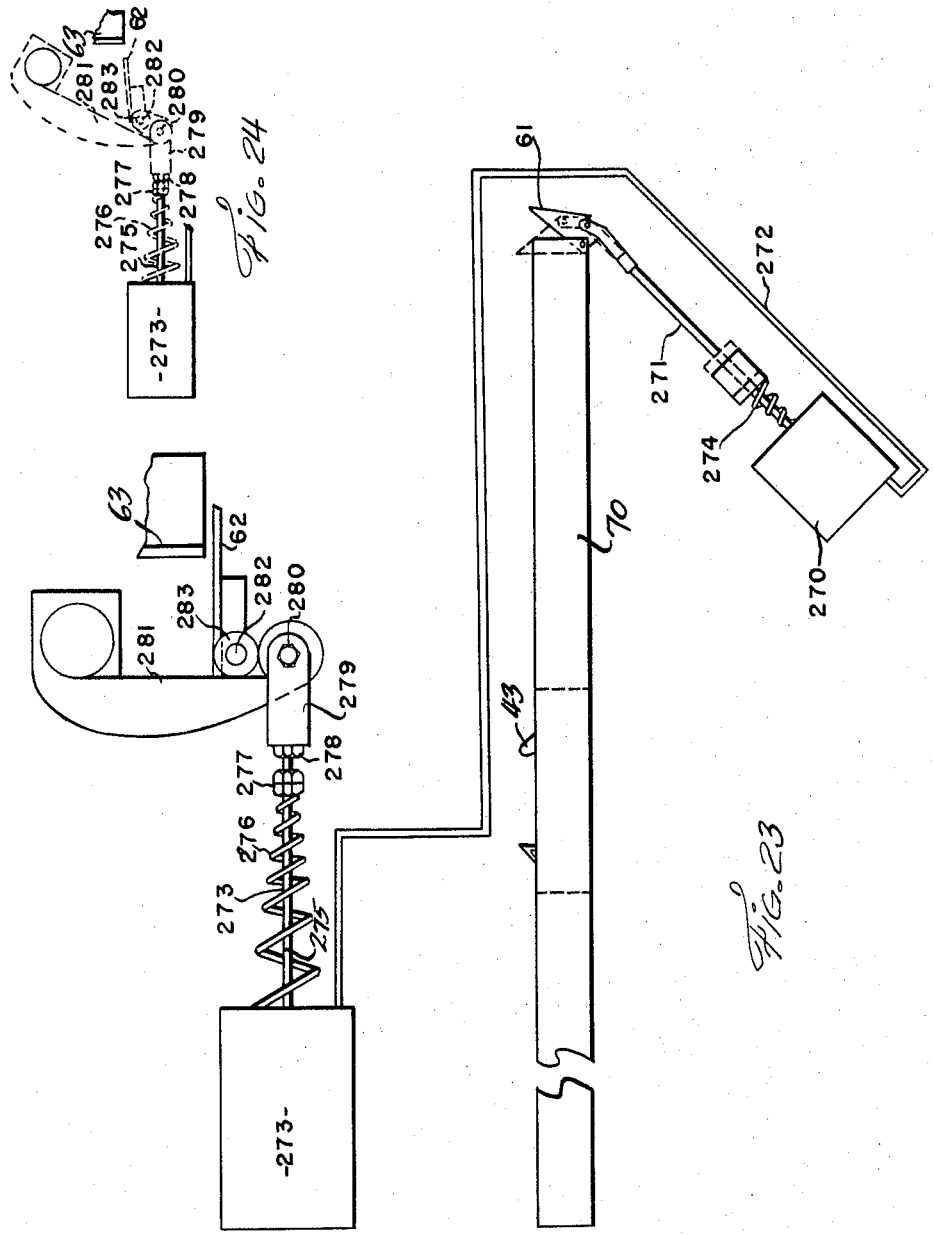
INVENTOR.
JOSEPH T. SCHOOLER
BY
ATTORNEY United States Patent Office 3,245,634
Patented Apr. 12, 1966

3,245,634
BANDING MACHINE
Joseph T. Schooler, Los Angeles, Calif., assignor to Textile Machine Works, Wyomissing, Pa., a corporation of Pennsylvania
Original application June 29, 1960, Ser. No. 39,641, now Patent No. 3,150,475, dated Sept. 29, 1964. Divided and this application Aug. 31, 1964, Ser. No. 400,620
9 Claims. (Cl. 242—75.43)

The present invention relates to packaging machinery and more specifically, to a machine which automatically bands square or rectangular packages, singly or in multiples, at a high rate of speed. This application is a division of my co-pending application Serial No. 39,641, filed June 29, 1960, now Patent No. 3,150,475.

While packaging machinery of the automatic type is a very highly developed art, there is still not available today a banding machine with that degree of versatility needed for banding any square or rectangular packages of any predetermined size, singly or in multiples, at a relatively high rate of speed. Banding of packages, either in singles or in multiples, is also becoming more and more desirable from a merchandising standpoint since such bands are an ideal and convenient means for relaying a merchandising message to potential purchasers and for packaging individual packages in multiples for promotional reasons. This use, however, is conditioned upon the availability of a suitable machine for performing the banding operation at a reasonable rate of speed so that the additional cost built into the product does not detract from the promotional advantages that are hoped to be gained. It is further necessary that any such machine be relatively low in cost so that the capital investment imposed upon the packager can be justified in the light of the promotional program contemplated for these banded packages. It will be appreciated, therefore, that any such banding machine to be practical on a commercial basis must be relatively simple in operation, substantially maintenance-free, and capable of operation at substantially high speeds. It is also ideally desired that the machine be readily adjustable to fit packages having a wide range of dimsensions and that bands of any predetermined width or desired length be capable of being applied to the packages fed the machine.

It is therefore a primary object of the present invention to generally improve the operation and construction of machines of this type.

A further object of the present invention is to provide a packaging machine having means for moving the package in a straight line through the machine and means for applying the banding material to the package as it moves in such straight line through such machine.

A still further object of the present invention is to provide a packaging machine having an automatic feed device which is adjustable to any size package being fed the machine and which automatically feeds the packages into the banding mechanisms of such machine.

Yet another object of the present invention is to provide a packaging machine which incorporates straight line feeding of the package to be banded and folding means movable substantially normally to said line of movement of said package as the same moves through such machine for folding the trailing ends of the banding material against such package.

Yet a further object of the present invention is to provide in a packaging machine of the type contemplated by this invention a band folding mechanism which comprises means for draping the banding material across the leading face and over the upper and lower surface of the package as the same moves in its line of travel and fold members for folding and sealing the trailing ends of said banding material across the trailing face of said package.

Other objects and advantages of the present invention will be readily apparent to those skilled in the art upon perusal of the following description and drawings in which:

FIG. 2 is a diagrammatic view disclosing the principles of the present invention and various sequences in the banding operation.

FIG. 3 is a side elevational view showing certain details of the banding material feed control mechanism.

FIG. 4 is a plan view of the package feed means, with parts removed to show details in construction.

FIG. 5 is a view taken along the line 5—5 of FIG. 6, with parts removed.

FIG. 6 is a side elevational view of a feed carriage, with parts removed and slightly enlarged.

FIG. 7 is a vertical sectional view taken on the line 7—7 of FIG. 4 slightly enlarged.

FIG. 8 is a view of the feed carriage drive means taken on the line 8—8 of FIG. 9.

FIG. 9 is a vertical sectional view of the banding machine disclosed in FIG. 1 disclosing certain details of the drive mechanism, with parts removed.

FIG. 10 is a side elevational view of the banding machine disclosed in FIG. 1, with parts removed, showing details in the banding material feed mechanisms.

FIG. 11 is a sectional view, with parts removed, taken on the line 11—11 of FIG. 12.

FIG. 12 is a view taken on the line 12—12 of FIG. 10, with parts removed.

FIG. 13 is a side elevational view of the draper plate constructions disclosed diagrammatically in FIG. 2, slightly enlarged.

FIG. 14 is an end view of certain structure disclosed in FIG. 13.

FIG. 15 is a vertical sectional view of the banding machine disclosed in FIG. 1 disclosing certain details of the drive mechanism and the upper and lower fold member constructions, with parts removed.

FIG. 16 is a view taken on the line 16—16 of FIG. 15, with parts removed.

FIG. 21 is a side elevational view with parts removed showing certain details in the drive mechanism.

FIG. 22 is a view taken on the line 23—23 of FIG. 9, with parts removed.

FIG. 23 is a vertical sectional view, slightly enlarged, taken on the line 28—28 of FIG. 4, showing details of the banding material cutting mechanism.

FIG. 24 is a view of certain structure disclosed in FIG. 23 showing the cutting knife in its non-cutting position.

Figure 1:
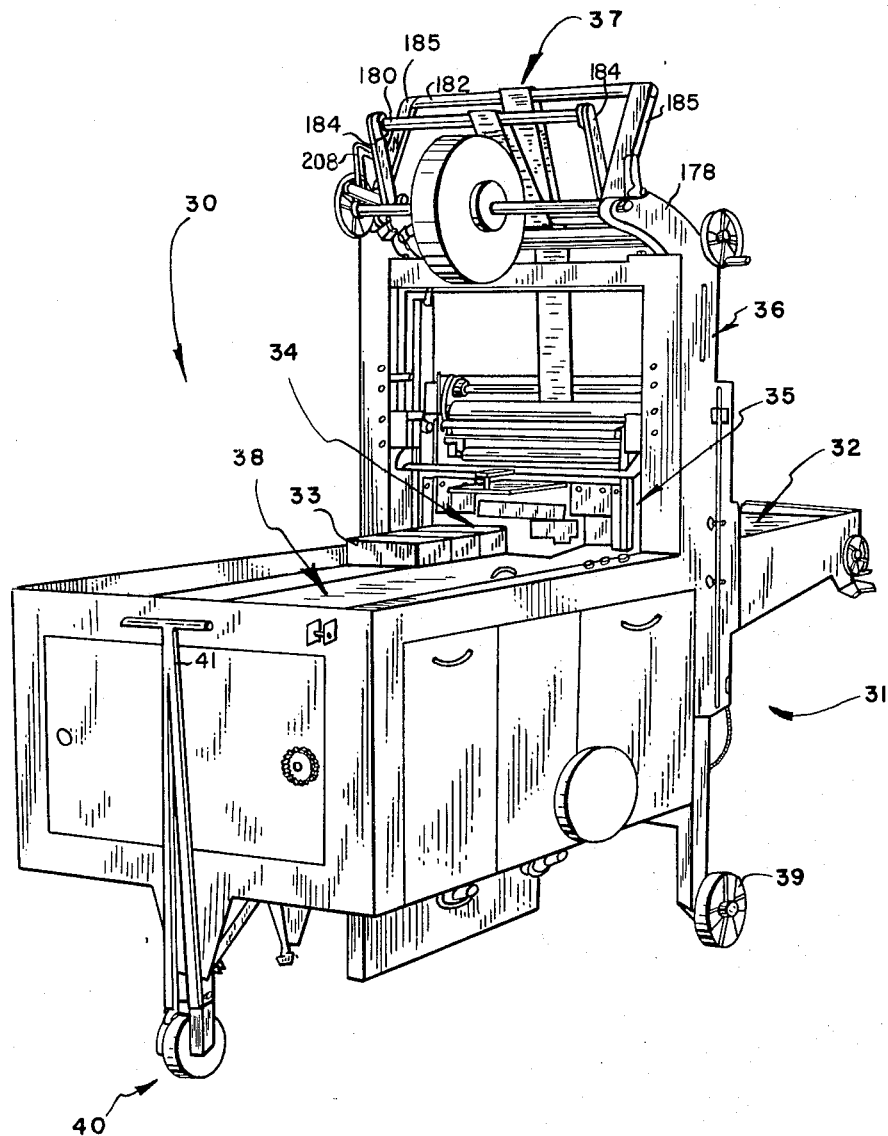
FIG. 1 is a perspective view of a banding machine embodying the principles of the present invention.

A machine for automatically banding packages and incorporating the principles of the present invention is disclosed in its entirety in FIG. 1 and identified broadly as 30. Banding machine 30 broadly comprises a support cabinet 31 fabricated from suitable structural members, the sides of which are covered with sheet material so as to protect the operator from the operating mechanism of the machine, with various doors and removable panels formed therein for permitting access to these mechanisms for maintenance and other purposes. The specific structure of the cabinet as such constitutes no part of the present invention and therefore is not disclosed or described in any detail. A feed mechanism, broadly designated as 32, functions so as to feed packages 33 to be banded into a banding mechanism broadly designated as 34. Banding mechanism 34 is located in the throat portion 35 of an arbor frame 36, arbor frame 36 supporting a label supply and feed mechanism 37. As will be more fully described hereinafter, the label supply and feed mechanism functions so as to feed a predetermined length of banding material into the path of travel of the package to be banded so that this predetermined length is draped around the package upon movement of the package through the banding mechanism. From the banding mechanism the banded package moves upon a discharge platform 38 for final disposition to a boxing machine or the like. The cabinet is movably supported adjacent one end by a pair of wheels 39 and at the other end by a caster wheel and brake mechanism 40 of any suitable or well-known construction, and preferably of that type whereby movement of a handle 41 into a pulling position automatically releases a brake thereby permitting an operator to easily move the machine from one location to another.

As previously suggested, a principal feature of the present invention entails means for feeding the packages to be banded in a straight line into the banding mechanism and means for applying the banding material to the package without movement of said package outside of its straight line course of travel. These basic principles are diagrammatically disclosed in FIG. 2 wherein a package 33 is moved in a straight line in the direction of the banding mechanism 34 by conveyer lugs 42. After the package has been moved a distance sufficient to trip an actuating lever 43 of a "no pack-no paper" microswitch 44, from position X to position Y, the lever 43 being interconnected with the microswitch by suitable linkage 45, a paper length cam 46, see FIG. 3, has been caused to rotate to a timed point that rocks a trip arm 47 about the axis of a shaft 48 a distance sufficient to actuate a reversing switch 49.

Actuation of the switch 44 and substantially simultaneous actuation of switch 49 actuates a power roll 50 by reversing the current from an electric brake to an electric clutch located adjacent its respective ends. A predetermined length of banding material 51 is therefore stripped from a roll 52 between the power roll 50 and a pressure roll 53 and directed downwardly between a pair of spaced plates 54 of the shuttle 55, the shuttel being in its dotted line position during this sequence of operation. When the cam 46 has rotated a distance sufficient to release trip arm 47 from switch 49, the power roll assumes its normal stopped position with the electric brake energized and the clutch de-energized, thereby discontinuing further feeding of the banding material downwardly into the shuttle. It will be appreciated that the adjusted position of switch 49 relative to arm 47 in cooperation with the location of the power roll 50 with reference to the package being banded determines the length and location of the banding material stripped from the roll.

As the package is again caused to move forwardly from position Y by feed fingers 56, the shuttle 55 is caused to move downwardly out of the path of travel of the package. The package is moved forwardly through a pair of spaced draper plates 57 and 58 into position A at which point it is located between suitable seal and pressure plates 59 and 60 with the banding material draped across the leading face and the upper and lower face of the package. During this movement, the package is caused to trip an actuating lever 61 of a normally energized solenoid and upon de-energization, a knife 62 is caused to cut the banding material at its preselected length. It will be appreciated that the knife 62 works in cooperation with a shear plate 63 for efficient cutting action. In sequence B a lower trailing edge 64 of the banding material is folded upwardly snugly against the trailing face of the package by a fold member 65. In sequence C a fold member 66 is caused to move downwardly in synchronized movement with the downward movement of fold member 65 to fold an upper trailing edge 67 of the banding material downwardly. The fold member 66 and the plates 59 and 60 have preferably incorporated therein heat sealing means so that during the holding and folding operations the banding material can be heat sealed to the package. It will also be appreciated that the trailing edge 67 extends rearwardly a greater distance than the trailing edge 64 so that during the folding operation the trailing edge 67 will be caused to overlap the trailing edge 64. In sequence D, the fold member 66 is caused to move or shift horizontally and rearwardly a predetermined distance, indicated as 68, prior to vertical movement back to its position disclosed in sequence A. This horizontal shift of member 66 upon completion of the folding and sealing operation permits this member to be returned to its starting position without ripping or unsealing the freshly sealed end of the banded material.

The movement of the package in its straight line travel by conveyer lugs 42 and feed fingers 56, the rotation of the cam 46, and up and down movement of the shuttle 55, the vertical movement of the fold member 65, and the vertical and horizontal movement of the fold member 66 are all synchronized so as to take place in a predetermined sequence of operation as will be described more fully hereinafter.

The specific details of the package feed mechanism 32 are most clearly disclosed in FIG. 4 and consist of a plurality of tracks 69, 70 and 71 for slidably supporting the packages in their path of travel to the banding mechanism 34. The center track 70 carries the trip levers 43 and 61 which are located in spaced relationship as previously mentioned, and the tracks 69 and 71 are adjustably movable in unison inwardly and outwardly relative to center track 70, indicated by dotted line positions 69' and 71', so that packages of varying sizes can be easily accommodated. This adjustable feature is effected by means of a pair of adjusting screws 72 and 73 which are chain connected by a suitable chain 74 trained around suitable sprockets 75 so that movement of one of the screws, for example screw 72, by a suitable handle 76, will cause a like movement in the same direction of the other screw 73. Each of the screws has a threaded end portion 77 which can have right-handed threads cut thereon, and a threaded end portion 78 which can have left-handed threads cut thereon, separated by a central non-threaded portion 79. The respective ends of each of the tracks 69 and 71 has fixed thereto a suitable nut 80 which threadedly engages its respective end portion of its respective screw, and the screws are so threaded as to cause, as previously suggested, movement in unison of tracks 69 and 71 either inwardly or outwardly relative to center track 70.

A slide rack 81 is fixed in spaced parallel relationship with respect to each of the tracks 69 and 71 and fixed in any suitable manner to the outer face of the nuts 80, a suitable thrust member 82 being slidably supported in suitable openings 83 formed adjacent the end of each of these slide racks 81. It will be appreciated adjustment of the tracks 69 and 71, either inwardly or outwardly relative to center track 70, will cause a like movement of the racks 81 in the same direction so that the spaced relationship of the racks 81 with respect to their respective tracks 69 and 71 is always maintained.

A feed carriage 84 is slidably supported on each of the slide racks 81. Each of these carriages is similar in construction and preferably fabricated from suitable sheet metal and L-shaped in cross section, see FIG. 5. A pair of U-shaped bearings, preferably nylon, 85, see FIG. 5, are fixed with each of the carriages 84 for slidably accommodating the respective racks 81 and for slidably supporting each of the carriages on its rack. The feed finger 56, which is in the form of a reverse stop, is provided adjacent the leading edge of a forwardly disposed and slightly elevated leg 86 of each carriage, see FIGS. 6 and 7. A leaf spring 87 urges each of the fingers 56 into their feed position so that when the carriages are moved in the direction of the banding mechanism, such fingers will move the package into such mechanism, but when traveling in the reverse direction, will pivot inwardly against the force exerted by spring 87 when encounting a package positioned on the tracks.

The conveyer lug or finger 42 associated with each carriage 84 constitutes one end of an arm 88 pivoted to swing up and down about a pin 89, the other end of the arm being interconnected by a tension spring 90 with a pin 91 fixed to its carriage. It will be appreciated, therefore, that when the carriages are moved in unison in a feeding direction, or in other words, toward the banding mechanism, that the lugs 42 will act so as to cause a package to move with movement of the carriages. When the carriages are being moved in their reverse direction, the action of the package against an incline face 92 of each of the lugs will cause arms 88 to be depressed downwardly against the force exerted by springs 90 a distance sufficient to permit the lugs to pass underneath said package.

Each of the carriages 84 is slidably interconnected by a U-shaped bracket 93 with a pull-and-push bar 94, see also FIGS. 8 and 9, and bar 94 is slidably supported by U-shaped bearings 95, preferably nylon, for to-and-fro movement on a pair of rigid and spaced frame members 96 and 97. The bar 94 is connected by means of a suitable yoke 98 to one end of the pitman 99, the other end of the pitman being connected to a drive mechanism 100 which will be explained in more detail hereinafter. It will be appreciated, however, that drive mechanism 100 in timed sequence with the other functioning mechanisms causes the carriages 84 to move in unison to-and-fro on the racks 81 to deliver the packages to the banding mechanism.

As previously mentioned, during movement of the package into its hold position between pressure and seal plates 59 and 60, the package first passes between the draper plates 57 and 58 where the banding material is draped across its leading face and rearwardly over its upper and lower surfaces, the trailing face of the package being in substantially vertical alignment with the path of movement of the fold members 66 and 65 when at rest between the pressure and seal plates. More specifically, the bottom draper plate 58 is fixed with the frame in any suitable manner so as to be substantially coplanar with the plane of the top surfaces of the tracks 69, 70 and 71. The upper draper plate 57 has an upwardly extending leading edge 101 for assisting the movement of the package into and between the draper plates. The upper plate is fixed by means of suitable bolts 102 to a support plate 103 which in turn is fixed to a pair of spaced members 104 located adjacent the opposite sides of the arbor frame 35, see FIGS. 10, 11 and 12. A pair of adjusting screws 105 depend downwardly adjacent the opposite sides of the arbor frame and threadedly engage each of the members 104. A bevel gear 106 is fixed to the upper end of each screw 105 and in intermeshing relation with a bevel gear 107 fixed in spaced relation on an adjustment shaft 109. It will be appreciated that rotation of shaft 109 by a handle 110 will cause a like rotation of each of the screws 105 in unison so that the upper draper plate can be easily and accurately adjusted relative to the bottom draper plate for accommodating packages of varying heights.

The bottom pressure and seal plate 60, see FIG. 13, consists of a first plate 111 which is preferably corrugated in cross section for elimination of friction, see also FIG. 14, a middle plate 112 which is preferably in the form of a heat seal plate of any suitable construction, and a back plate 113. The first and back plates are fixed by bolts 114 in spaced relation with a suitable support member 115 which constitutes a part of the frame structure, and the middle plate 112 is positioned in substantially coplanar relationship with respect to the first and back plates by means of suitable screws 116. The upper plate 59 is similarly constructed and comprises a first plate 117, a middle plate 118, also in the form of a heat seal plate, and a back plate 119, all of which are positioned in coplanar relationship. These three plates are interconnected in spaced relation by bolts 120 with a support member 121 which is fixed to each of the adjustable members 104 for movement up or down in unison with the upper draper plate.

The lower fold member 65, see FIGS. 15 and 16, is preferably in the form of an angle section 122, a horizontal leg 123 of which is fixed by means of a suitable screw 124 to one end of a pitman 125, and a vertical leg of which functions as the banding material folding member. A pair of vertical posts 127 depend downwardly from a rigid frame member 128 and are slidably received in suitable openings 129 formed in the leg 123 for guiding the up and down movement of the fold member 65 in a predetermined path of movement. The other end of the pitman 125 is connected with a drive mechanism 130 which will be more fully described hereinafter.

Figures 17, 18:
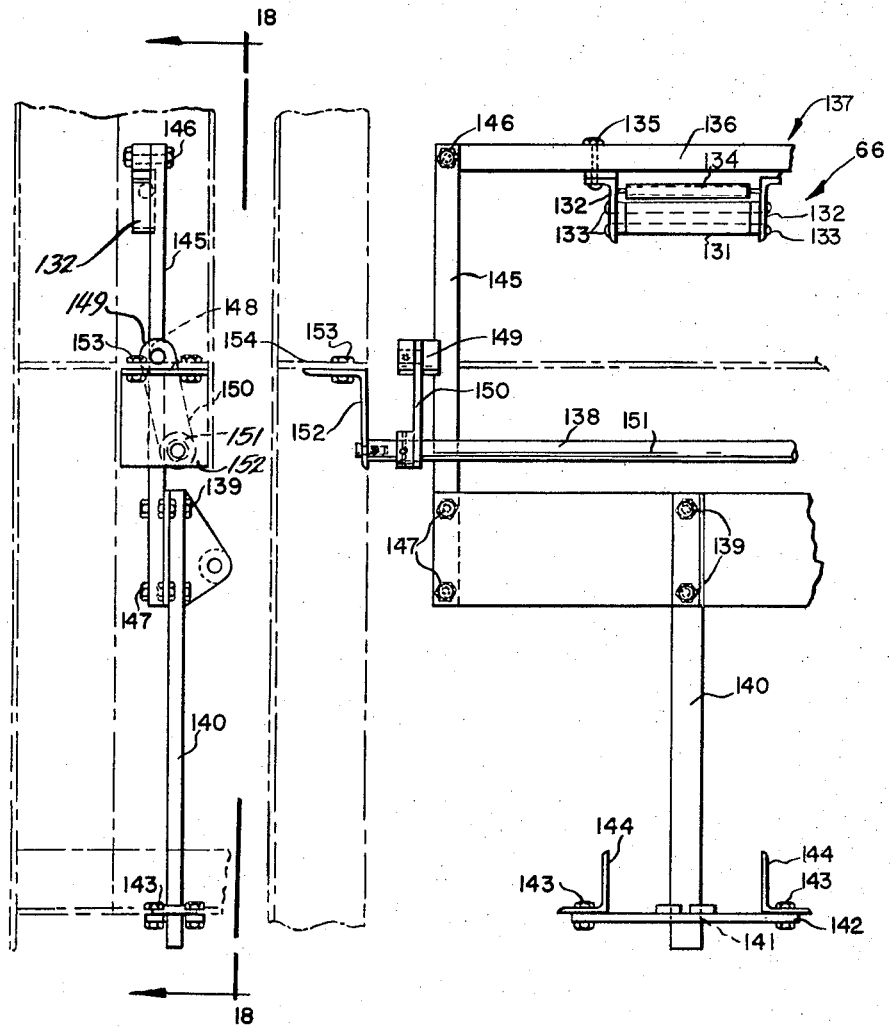
FIG. 17 is a side elevational view disclosing certain details of construction of the upper fold member.
FIG. 18 is a view taken on the line 18—18 of FIG. 17, with parts removed and with parts broken away to show details in construction.

The upper fold member 66, as previously suggested, is preferably in the form of a heat seal plate 131 so that during the folding operation the trailing ends of the banding material will be heat sealed together. The member 66 is anchored between a pair of spaced brackets 132, see FIGS. 17 and 18, by means of suitable screws 133, and a suitable roller 134 is located in trailing relationship to the plate 131 so as to follow and roll the folded banding material after the sealing operation. This causes a temperature drop sufficient to congeal the melted wax or thermoplastic. The brackets 132 are secured by means of suitable bolts 135 to a top leg 136 of a support carriage 137, a bottom leg 138 of the carriage being fixed by means of suitable bolts 139 to one end of the pitman 140. The pitman 140 is slidably received in an opening 141 formed in a guide plate 142, and the guide plate is fixed by bolts 143 to suitable rigid frame members 144 so as to be in predetermined fixed position.

A vertical leg 145 is interconnected by bolts 146 and 147, respectively, with each of the corresponding ends of the top and bottom legs of support carriage 137, and is slidable in a slot 148 formed in a bushing 149. Each bushing 149 is fixed to one end of a leg 150 of a rock shaft 151, the rock shaft 151 being rotatably supported adjacent its ends by suitable brackets 152. The brackets 152 are secured by means of bolts 153 to a rigid frame member 154. It will be appreciated, therefore, that the position of the rock shaft 151 determines the predetermined vertical path of movement of the carriage 137 and consequently of the member 66, and any rocking of the rock shaft 151 in one direction will be responsible for shifting the fold member 66 in the same and substantially horizontal direction.

The other end of the pitman 140, refer to FIG. 9, is connected to a drive mechanism 155 which causes the carriage to move in its predetermined up-and-down sequence of travel as will be more clearly described hereinafter.

A leg 156, refer to FIG. 15, which constitutes the other leg of the rock shaft 151, is pivotally connected by bolt 157 to one end of a push rod 158, the other end of the push rod being connected by a pivot bolt 159 to a lever 160. The lever 160 is fulcrumed about the axis of a bolt 161 and its opposite end face 162 rides upon the surface of a cam 163. As will be more fully described hereinafter, the action of the cam riding upon the face 162 will at the proper sequence of operation push the rod 158 a distance sufficient to rock the rock shaft 151 that predetermined distance in one direction to cause the fold member 66 to move horizontally that distance indicated as 68, FIG. 2, sequence D. This horizontal shift 68 is of course effected by movement of the carriage 137 by reason of the sliding engagement of the legs 145 in slots 148 of the bushing 149. Therefore, while the up-and-down movement of the fold member 66 is controlled by drive mechanism 155, the path of travel of this member is controlled by the position of the rock shaft 151 which of course is responsive to the action of the cam 163 upon the push rod 158.

The shuttle 55 consists of the two plates 54 formed of suitable metal secured to an angle bracket 164 by means of suitable bolts 165 and spacers 166. A horizontal leg 167 of the bracket 164 has a pair of spaced openings 168 formed therein, each of which slidably receives a guide post 169 depending from a suitable support structure 170. One end of a pitman 171 is fixed to the face of a vertical leg 172 of the bracket and the other leg of the pitman is suitably connected by a pivot pin 174 to a drive mechanism 175, refer also to FIG. 15, the operation of which will be described more fully hereinafter.

The label supply and feed mechanism 37 is most clearly disclosed in FIGS. 10, 11 and 12. The banding material is carried in the form of a tightly wound roll 176 on a shaft 177 rotatably supported between a pair of support brackets 178, each of brackets 178 being in the form of a casting which constitutes an upper member of the arbor frame. A braking mechanism 179 is associated with one end of the shaft 177 for holding the roll 176 during the non-stripping of banding material by the power roll and for applying a predetermined resistance during the stripping operation so that the roll does not rotate at a rate of speed greater than the power roll is feeding the material downwardly in the direction of the shuttle. The free end of the banding material is stripped from the roll 176 and directed upwardly over a slack roll 180, and then downwardly and around an idler roll 181, and then again upwardly and around a tension roll 182, and then downwardly again over directional roll 183 and downwardly between the power roll and the pressure roll. The slack roll 180 is rotatably carried between a pair of slack roll arms 184, and the tension roll 182 is rotatably carried between a pair of tension roll arms 185. A suitable stub shaft 186 is fixed to each of the support brackets 178 and extends inwardly in substantially coaxial relationship. Each of the slack roll arms 184 and the tension roll arms 185 is preferably in the form of a casting with a hub portion 187 and 188 respectively, being formed adjacent the free end thereof. The hub portion of each of these arms is rotatably received by its respective stub shaft so that a slack roll arm and a tension roll arm is each received by each of the stub shafts, the tension roll arms being spaced on the outside of the slack roll arms. A suitable spacer 189 is located between the hub 188 of each of the tension roll arms 185 and its support bracket 178 for obvious reasons. Since each of the slack roll arms and each of the tension roll arms is interconnected at its ends by its respective roll, it will be appreciated that the arms along with its roll are capable of swinging up or down in unison about the axis of the stub shafts. The tension roll 182 along with its accompanying tension roll arms 185 is normally urged upwardly and rearwardly by the compressive force of a pair of springs 191 to an extent sufficient to cause complete braking of the roll 176 by the braking mechanism 179. The springs 191 each encircle a rod 192 which at its lower end is slidably received in an opening 193 formed in a suitable spring seat 194. The other end of each of the rods 192 is pivotconnected by a bolt 195 to a suitable standard 196 fixed to its respective tension roll arm 185. The springs 191, therefore, are in compressed condition between its standard 196 and its spring seat 194 and the compressive force of each spring urges its respective arm 185 into its above mentioned normal position.

Each of the slack roll arms 184 also have pivotally secured thereto by means of a bolt 197 a spring rod 198 which is slidably received in a suitable opening 199 in the spring seat 194. A compression spring 201 encircles each rod 198 and is similarly maintained under compression so as to urge its respective arm 184 to swing rearwardly against the tension of the banding material.

The braking mechanism 179, as previously suggested, is controlled by the position of the tension roll 182. More specifically, this braking mechanism comprises a brake pulley 202 fixed to one end of the shaft 177. A brake band 203 is positioned so as to ride in the V-notch of the brake pulley and is anchored at its respective ends by anchor studs 204 and 205. The anchor stud 204 is fixed to one end of a lever arm 206, and the stud 205 constitutes one end of a pivot bolt 207 about which the lever arm is fulcrumed, the bolt 207 being fixed in the associated anchor bracket. The lever arm is link connected with the associated tension roll arm by a link 208, and the other end of the lever arm is urged to swing about the fulcrum by a compression spring assembly 209. It will be noted that the compression spring assembly 209 normally urges the lever arm 206 to move in its unbraking direction as opposed to the force normally being exerted against the tension roll arms tending to move, through link 208, the lever arm in its braking direction.

The composite compressive force of the spring 191 and compression spring assembly 209 is greater than the compressive force of spring 201, and this greater compressive force is further augmented by the fact that the distance from the axis of each of the bolts 195 to the axis of its respective stub shaft 186 is greater than the distance from the axis of each of the bolts 197 to its respective stub shafts 186. During the stripping operation, the pulling force exerted upon the banding material by the power roll is initially transmitted to the slack roll and causes the slack roll to swing forwardly against the compressive force exerted by the springs 201. This initial movement of the slack roll causes a predetermined slack in that banding material extending from the roll to the power roll. When this slack has been taken up by the continued rotation of the power roll, the tension force exerted against the tension roll is sufficient to overcome the composite force of springs 191 and 209 and the tension roll is caused to swing forwardly. The forward movement of the tension roll releases the brake mechanism to an extent commensurate with the movement of the tension roll so that the banding material can be stripped from the roll. At the conclusion of the stripping operation, or in other words, when the current is once again reversed from the electric clutch to the electric brake and the power roll is stopped, the tension roll, because of the greater compressive force urging this roll to resume its normal position returns to this position first which, of course, causes the braking mechanism once again to brake the roll and then subsequently the slack roll swings rearwardly and takes up the slack between the tension roll and the roll 176.

Figure 19:
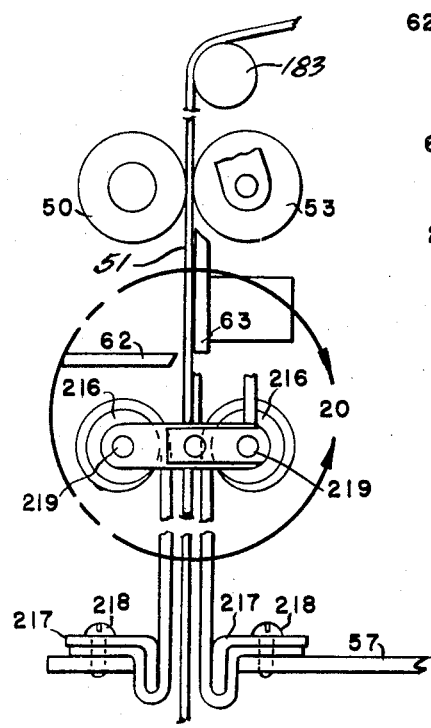
FIG. 19 is a side elevational view showing certain details in construction of the banding material feed mechanism, with parts removed.
Figure 20:
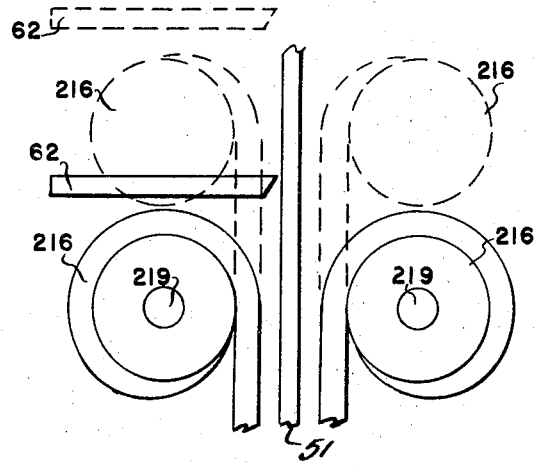
FIG. 20 is an enlargement of that area encircled by line 20 of FIG. 19.
Figure 25:
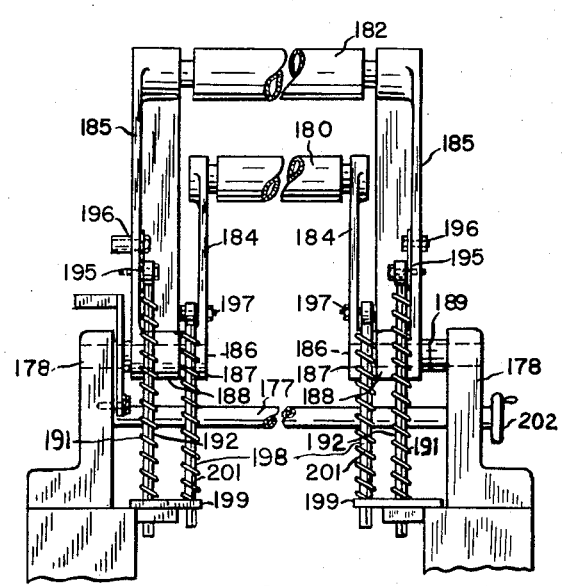
FIG. 25 is a view taken along line 25—25 of FIG. 10.

The power roll 50 and pressure roll 53 can be of any suitable or well-known construction, and as previously suggested, the power roll of the present instance is preferably of that type which is operable by energization and de-energization in timed sequences of an electric clutch located at one end of the roll and an electric brake which is located at the other end of the roll. In a structure of this type, when the power roll is non-operative, the brake is energized so as to hold the roll against rotation and the clutch de-energized. During the feeding of the paper to the banding mechanism, the current is reversed from the electric brake to the electric clutch and the roll is then run for that time necessary to strip a predetermined length of banding material, after which the current is then reversed back to the brake. Both the power roll and the pressure roll are carried in suitable carriages 210 each of which is threadedly engaged by an adjusting screw 211. Each of the screws 211 is rotatably interconnected by a pair of intermeshing bevel gears 212 and 213 to a shaft 214, one end of shaft 214 having a suitable handle 215 fixed thereto. It will be appreciated that by turning the handle 215, the adjusting screws 211 can be caused to rotate in unison in a particular direction so as to cause a like movement up or down of the carriages 210 and the power roll and pressure roll. Carried between the carriage 210 is a pair of curtain rolls 216, the lower ends of each of which is fixed by means of a bracket 217 and a screw 218 to the upper draper plate 57, see FIGS. 19 and 20. The material of the curtain rolls is preferably wound on suitable tension rolls 219 and movement of the curtain rolls up or down relative to the draper plate in accordance with a like movement in the same direction of the power roll and pressure roll, or of the upper draper plate up or down relative to the power roll, will cause the curtain to either contract or expand. It will further be appreciated that the curtain rolls direct the banding material downwardly from the power roll into the shuttle and protect the same against wind or any other disturbance which might cause the banding material not to drop into the shuttle.

As previously mentioned, the various operating mechanisms of the banding machine are driven from suitable drive mechanisms so that the sequence of operation relative to both the feeding of the package and the operation of the banding mechanism itself takes place in a predetermined orderly sequence of operation. The main mode of power for the banding machine is derived from an electric motor 220 which is suitably mounted in a suitable location in the cabinet, refer to FIG. 21. The motive force of the motor is transmitted from a motor pulley 221 to a driven pulley 222 by means of a suitable belt 223. The driven pulley 222 has a shaft 224 which carries a suitable driving sprocket 225, and a chain 226 is entrained around sprocket 225 and around a driven sprocket 227 connected to the driven end of the power roll 50. Suitable idler sprockets 228 are so located as to direct one flight of the chain upwardly around the driven sprocket 227 and downwardly around an adjustable idler sprocket 229 which is so interconnected with the power roll as to move up or down in unison with such roll during adjustment of the roll relative to the banding mechanism.

The shaft 224 of the driven pulley also has a spur gear 230 fixed thereto which is in intermeshing relationship with a power gear 231, the power gear 231 being in intermeshing relationship with an adjacent power gear 232, see also FIGS. 23 and 9. Each of power gears 231 and 232 is suitably fixed to respective shafts 233 and 234 which in turn are suitably rotatably supported in bearings 235 carried on suitable frame members of the cabinet. It will be appreciated, therefore, that a constant rate of rotation imparted by the motor 220 to the driven pulley 222 will cause a predetermined equal rate of rotation to each of the power gears 231 and 232 in opposite directions.

The drive mechanism 100 which, as previously suggested, causes linear movement in a to-and-fro direction of the feed carriages 84, is driven from the power gear 232. More specifically, a cam 236 is fixed to the shaft 234 adjacent the power gear 232 and has fixed thereto a power transmitting pin 237. A rock arm 238 is pivotally carried adjacent its apex by a stub shaft 239, and a leg 240 is connected by a bolt 241 to the other end of the pitman 99. Another leg 242 has a slot 243 formed therein which slidably receives the force transmitting pin 237. It will be appreciated, therefore, that rotation of the power gear 232 will cause a like rotation of the cam 236 and the force transmitting pin 237, and the action of the force transmitting pin in the slot 243 of leg 242 during the course of its rotative travel will rock the leg 240 of the rock arm 238 to and fro in its predetermined path of movement.

The drive mechanism 155 controls the up-and-down movement of the upper fold member 66 as previously mentioned. This drive mechanism comprises a rock arm 244 which is rotatably carried adjacent one end on a suitable stub shaft 245. A force transmitting leg 246 is pivotally connected by a suitable bolt 247 to the other end of the pitman 140 so that up-and-down rocking movement of such rock arm about the axis of the stub shaft 245 will impart a like up-and-down movement to the pitman and, as previously described, to the upper fold member. Another leg 248 carries a suitable roller 249 adjacent the end thereof which is in frictional engagement with a cam surface 250 of the cam 236. It will be appreciated that the weight of the leg 246 maintains the roller 249 in frictional engagement with the cam surface. It will also be appreciated that the rotative speed of the power gear 232, the shape and relationship of the cam surface 250, and the path of movement of the force transmitting pin 237 can be so interrelated that the linear force transmitted to the pitman 99 will be in timed relationship to the force imparted to the pitman 140.

The power gear 231, as previously mentioned, is in intermeshing relationship with the power gear 232 and rotates at a like speed in the opposite direction. The previously mentioned cam 163 is fixed to the shaft 233 so as to rotate in unison with rotation of the power gear 231. The face of the cam 163 imparts that predetermined linear motion to push rod 158 which is directly responsible for effecting horizontal shift of the upper fold member indicated as 68 in FIG. 2, sequence D.

The position and movement of the lower fold member 65 is controlled by a drive mechanism 130. This drive mechanism consists of a cam 251 fixed to the shaft 233 adjacent cam 163. A mounting bracket, which is preferably in the form of suitable casting 252, is bolted with suitable bolts 253 to frame members 254 and rockably mounts a rock arm 258 on a stub shaft 258a. A leg 259 of the rock arm has a roller 260 carried adjacent its end which is positioned in rolling frictional engagement with a cam surface 261 of cam 251. Another leg 262 has rotatably fixed adjacent its end by means of a bolt 263 the other end of the pitman 125. Suitable resilient means, not visible, are provided for normally urging the rock arm 258 to rock in a direction so as to maintain the roller 260 in constant frictional engagement with the cam surface 261.

The drive mechanism 175 controls the up-and-down movement of the shuttle 55. This drive mechanism consists of a rock arm 264 which is fixed adjacent its apex to a shaft 265 which is rotatably carried by the bracket 252. A leg 266 of the rock arm has fixed adjacent its end a roller 267 which is positioned in frictional engagement with a cam surface 268 of the cam 163. Another leg 269 is interconnected adjacent its end by the pivot pin 174 to one end of the pitman 171 so that rocking movement of such rock arm about the axis of shaft 265 imparts push or pull motion to said pitman and consequently, moves the shuttle upwardly or downwardly in its predetermined path of travel. The rock arm 264 is, like rock arm 258, resiliently urged in any suitable manner, not visible, to normally rock in a direction so as to maintain the roller 267 in frictional engagement with its cam surface 268.

Since each of these drive mechanisms is controlled by the action of cam surfaces and the force transmitting pin, and since the rotative movement of the respective cam surfaces and the force transmitting pin is dependent upon the constantly rotating shafts 233 and 234, which as previously mentioned rotate at the same rate of speed in opposite directions, it is possible through the correct profile for each of the cams and the proper disposition of said pin to impart that linear movement to the feed carriages, that vertical movement of the shuttle, that vertical movement of the lower fold member, and that vertical and horizontal movement of the upper fold member in that predetermined sequence of operation set forth with reference to FIG. 2.

In the operation of the banding machine, as the initial package is fed to the feed mechanism and supported on the tracks 69, 70 and 71, it is first engaged by the feed lugs 42 of the feed carriages which are positioned in their rearward position relative to the banding mechanism. The maximum forward distance of travel imparted to the feed carriages by the drive mechanism 100 carries the package from this initial starting position to a position that actuates the "no pack-no paper" microswitch 44. Concurrently with actuation of this microswitch, the cam 46, which incidentally is fixed to one end of shaft 233, has caused the rock arm 47 to rock a distance sufficient to actuate the cam switch 49. As previously suggested, the power roll is controlled through the selective energization and de-energization of an electric clutch located adjacent one end, and an electric brake located adjacent the other end. Actuation of the microswitch 49 concurrently with actuation of microswitch 44 reverses the current from the electric brake to the electric clutch, and the power roll is caused to rotate and strip banding material from the roll 52 downwardly into the shuttle 55. As soon as the cam 46 has rotated a distance sufficient to release the rock arm 47 from the microswitch 49, the current is again reversed or assumes its normal position whereby the clutch is de-energized and the brake energized.

Since this discussion is relative to the operation with reference to the initial package, it will be appreciated that as this initial package is moved in its first step of travel, from position X to position Y, FIG. 2, by the feed lugs 42, the feed fingers 56 would normally move with the feed carriage so as to carry a package already stationed at position Y forwardly into the banding mechanism through the draper plates and into its hold position between the pressure and seal plates. Therefore, during the initial operation with reference to the first package, the shuttle 55 and the upper and lower fold members 66 and 65 will be caused to move in their predetermined sequence of operation in spite of the fact that there is no package stationed between the pressure and seal plates. It will be appreciated, however, that the knife 62 is not caused to cut the banding material since this is controlled by de-energization of the solenoid which in turn is controlled by the switch 61.

At the completion of the initial complete sequence of operation with the initial package at station Y, the feed carriages are again caused to move rearwardly to their start position with reference to their feeding operation. At this position the feed fingers 56 are moved into pushing relationship with respect to the initial package stationed at position Y. Forward movement of the feed carriage by drive mechanism 100 then moves the package forwardly so as to initially trip lever 61 which, as previously suggested, de-energizes the solenoid, holding knife 62 in its noncutting position, and knife 62 then cuts the banding material. Concurrent with forward movement of the initial package from station Y, the shuttle 55 is caused to move downwardly by the drive mechanism 175. Therefore, as the package moves between the draper plates, the shuttle has moved vertically out of the path of travel of the package. The movement of the package into the draper plates causes the banding material to be draped across its leading face and rearwardly over the upper and bottom surfaces. The end of the forward movement of the feed carriages is sufficient to cause the feed fingers to move the package into its proper position between the pressure and seal plates with the trailing edge being in substantially vertical alignment with the path of movement of the upper and lower fold members. The length of cut of the banding material is controlled by the length of time the microswitch 46 is actuated, and the relationship of the upper and lower trailing edges of the banding material with reference to the package is controlled by the vertical position of the power roll and the pressure roll with reference to the package.

With the package in its position A, FIG. 2, between the pressure and seal plates, the drive mechanism 130 causes the vertical folding movement of the fold member 65, and in timed relationship with respect thereto, the drive mechanism 155 causes the vertical movement of the upper fold member 66 so that the folding and sealing operation is effected in the manner previously described, the push rod 158 rocking the rock shaft 151 a distance sufficient to shift the fold member horizontally that distance indicated as 68 in sequence D immediately prior to the return vertical movement of the fold member. During these sequences of operation the feed carriages were being moved backwardly once again into their initial feed position, and the whole process is resumed with reference to the next packages in positions X and Y.

As previously suggested, the knife 62 is controlled by a normally energized solenoid and is caused to move in a cutting direction when said solenoid is de-energized. The details of this construction are set forth in FIGS. 23 and 24 wherein the actuating lever 61 is indicated as being pivotally connected to the end of the middle track 70 and when actuated by the package actuates a microswitch 270 through a linkage 271. The microswitch 270 controls through a lead 272 the energization of a solenoid 273 and the solenoid 273 is normally energized when the lever 61 is in its normal or non-actuated position, which position is maintained by a spring 274. A push rod 275 of the solenoid is encircled by a spring 276 which is maintained in compression by suitable lock nuts 277. The end of the rod 275 is fixed by a nut 278 to a suitable clevis 279 which in turn is pivotally connected by a bolt 280 to one end of a pair of knife support levers 281. Each of the levers 281 is pivotally supported adjacent its upper end in any suitable manner to each of the carriages 210 so that the knife 62 is maintained in a proper space position with reference to the power roll and pressure roll. The knife itself is pivotally attached at its opposite ends by a pivot pin 282 received in a suitable journal 283.

FIG. 24 discloses the solenoid in its normally energized state with the arms 281 swung backwardly an extent sufficient to move the knife to its noncutting position relative to the shear plate 63. Upon de-energization of the solenoid, the compressive force of the spring 276 against the lock nuts 277 urges the entire assembly to swing forwardly and the knife 62 in shearing or cutting relationship with reference to the shear plate 63.

The circuitry for interconnecting the electrically responsive elements to a suitable source of electrical energy constitutes no part of the present invention and can be of any suitable or well-known design. For this reason, it is not disclosed in detail except insofar as the functions of the electrically controlled mechanisms have been described.

I claim:

1. A material supply and feed mechanism for a wrapping machine comprising a material supply roll mounted for rotation about a predetermined axis, power means for stripping material from said supply roll, brake means associated with said supply roll for resisting rotation of said roll, tension means between said power means and said supply roll responsive to the tension imposed upon said material, said brake means being responsive to the tension exerted upon said tension means, and slack take-up means interposed between said tension means and said supply roll and biased in a slack take-up direction for movement toward maximum slack take-up position when said power means is in its non-stripping position.

2. The mechanism defined in claim 1 further characterized by the force exerted against said tension means resisting the stripping force of said power means being greater than the force exerted against said slack take-up means resisting said stripping force of said power means.

3. The mechanism defined in claim 2 further characterized by said tension means and said slack take-up means constituting rolls swingable about axes substantially parallel with the axis of said supply roll.

4. The mechanism defined in claim 3 further characterized by the axis of said tension roll being coaxial with the axis of said slack roll.

5. The mechanism defined in claim 4 further characterized by resilient means resisting swinging of said tension roll and said slack roll in response to the stripping force exerted by said power means.

6. A material feed mechanism for a package wrapping machine comprising support means for rotatably supporting a material supply roll, power means for stripping material from said supply roll, a tension roll swingable about an axis substantially parallel with the axis of said supply roll, a slack roll swingable about an axis substantialy parallel to the axis of said supply roll, an idler roll rotatable about an axis substantially parallel to the axis of said supply roll, said rolls being disposed between said suppy roll and said power means and said material being trained over said slack roll around said idler roll and over said tension roll and to said power means, resilient means reacting against said slack roll normally urging said slack roll to swing in a direction against the stripping force exerted by said power means, and resilient means reacting against said tension roll to swing in a direction against the stripping force exerted by said power means, the resilient force exerted against said tension roll being greater than the resilient force exerted against said slack roll.

7. The mechanism defined in claim 6 further characterized by braking means being associated with said supply roll and being responsive to the swinging movement imparted to said tension roll by the stripping force of said power means.

8. The mechanism defined in claim 7 further characterized by said braking means comprising a brake pulley fixed with one end of said label roll and a brake band movable into braking or unbraking relationship with respect to said pulley in response to the swinging movement of said tension roll.

9. The mechanism defined in claim 8 further characterized by said brake band being carried by a lever and said lever being link connected with said tension roll.

References Cited by the Examiner
UNITED STATES PATENTS

| | | | |
|---|---|---|---|
| 992,225 | 5/1911 | Maxwell | 53—389 X |
| 2,557,185 | 6/1951 | Gibbs | 242—75.43 |
| 3,076,618 | 2/1963 | Van Hook | 242—75.42 |

M. HENSON WOOD, Jr., *Primary Examiner.*

ROBERT B. REEVES, *Examiner.*

J. N. ERLICH, *Assistant Examiner.*